United States Patent
Huang et al.

(10) Patent No.: US 10,558,328 B2
(45) Date of Patent: Feb. 11, 2020

(54) DISPLAY SCREEN UNLOCKING METHOD AND APPARATUS

(71) Applicant: Xiaomi Inc., Beijing (CN)

(72) Inventors: Yuanyuan Huang, Beijing (CN); Yang Hu, Beijing (CN)

(73) Assignee: XIAOMI INC., Beijing (CN)

(*) Notice: Subject to any disclaimer, the term of this patent is extended or adjusted under 35 U.S.C. 154(b) by 518 days.

(21) Appl. No.: 15/234,501

(22) Filed: Aug. 11, 2016

(65) Prior Publication Data

US 2017/0153773 A1   Jun. 1, 2017

(30) Foreign Application Priority Data

Nov. 28, 2015   (CN) .......................... 2015 1 0850304

(51) Int. Cl.
| | | |
|---|---|---|
| G06F 3/0482 | (2013.01) | |
| G06F 21/32 | (2013.01) | |
| G06F 9/451 | (2018.01) | |
| G06F 21/62 | (2013.01) | |
| G06K 9/00 | (2006.01) | |

(52) U.S. Cl.
CPC ............ *G06F 3/0482* (2013.01); *G06F 9/451* (2018.02); *G06F 21/32* (2013.01); *G06F 21/6218* (2013.01); *G06K 9/00087* (2013.01)

(58) Field of Classification Search
CPC ........ G06F 21/31; G06F 21/32; G06F 3/0482; G06F 21/6218; G06K 9/0087
See application file for complete search history.

(56) References Cited

U.S. PATENT DOCUMENTS

| | | | | |
|---|---|---|---|---|
| 8,504,842 | B1* | 8/2013 | Meacham | G06F 3/0488 713/182 |
| 8,847,903 | B2* | 9/2014 | Stokes | G06F 3/04883 345/156 |
| 2009/0006991 | A1 | 1/2009 | Lindberg et al. | |
| 2010/0146384 | A1 | 6/2010 | Peev et al. | |
| 2010/0269040 | A1* | 10/2010 | Lee | G06F 3/04817 715/702 |
| 2011/0296356 | A1* | 12/2011 | Chaudhri | G06F 3/04883 715/863 |

(Continued)

FOREIGN PATENT DOCUMENTS

| | | |
|---|---|---|
| CN | 102624979 A | 8/2012 |
| CN | 102650924 A | 8/2012 |

(Continued)

OTHER PUBLICATIONS

Flyme 5.1.1.0A for MX5, Nov. 20, 2015, <http://bbs.flyme.cn/thread-444801-1-1.html>, 3 pages.

(Continued)

*Primary Examiner* — Dino Kujundzic
(74) *Attorney, Agent, or Firm* — Brinks Gilson & Lione

(57) ABSTRACT

A method and apparatus are disclosed for automatically switching display screen of an electronic device from a locked-screen interface to an internal interface of an application upon unlocking of the display screen using an unlocking application. The switching to the internal interface of the application may be achieved via either explicit or implicit call via the configuration information of the application associated with the internal interface and the unlocking application.

16 Claims, 12 Drawing Sheets

(56) References Cited

U.S. PATENT DOCUMENTS

| | | | |
|---|---|---|---|
| 2012/0036556 A1 | 2/2012 | LeBeau et al. | |
| 2012/0084734 A1* | 4/2012 | Wilairat | G06F 21/36 715/863 |
| 2012/0284297 A1* | 11/2012 | Aguera-Arcas | G06F 3/03547 707/769 |
| 2013/0067376 A1* | 3/2013 | Kim | G06F 3/0488 715/769 |
| 2013/0082945 A1* | 4/2013 | Jo | H04M 1/67 345/173 |
| 2013/0086522 A1 | 4/2013 | Shimazu et al. | |
| 2013/0191910 A1* | 7/2013 | Dellinger | G06F 3/0488 726/19 |
| 2013/0283199 A1* | 10/2013 | Selig | G06F 3/0484 715/781 |
| 2013/0322705 A1 | 12/2013 | Wong | |
| 2014/0033136 A1* | 1/2014 | St. Clair | G06F 3/017 715/863 |
| 2014/0033140 A1 | 1/2014 | Zeng | |
| 2014/0033298 A1* | 1/2014 | Park | G06F 21/32 726/17 |
| 2014/0109024 A1 | 4/2014 | Miyazaki | |
| 2014/0181840 A1* | 6/2014 | Sugaya | G06F 21/629 719/313 |
| 2014/0295795 A1* | 10/2014 | Miyazaki | H04W 12/06 455/411 |
| 2014/0358970 A1* | 12/2014 | Morris | G06F 17/30392 707/772 |
| 2015/0046831 A1* | 2/2015 | Liang | G06F 3/04817 715/741 |
| 2016/0364559 A1* | 12/2016 | Bali | G06F 21/32 |
| 2018/0024846 A1* | 1/2018 | Wu | G06F 21/31 715/741 |

FOREIGN PATENT DOCUMENTS

| | | |
|---|---|---|
| CN | 103064606 A | 4/2013 |
| CN | 103546639 A | 1/2014 |
| CN | 103593110 A | 2/2014 |
| CN | 103885671 A | 6/2014 |
| CN | 104143060 A | 11/2014 |
| CN | 104571838 A | 4/2015 |
| CN | 104978109 A | 10/2015 |
| CN | 104991716 A | 10/2015 |
| EP | 2 733 594 A1 | 5/2014 |
| JP | 2012-511282 A | 5/2012 |
| JP | 2013-025357 A | 2/2013 |
| JP | 2013-093020 A | 5/2013 |
| JP | 2013-228953 A | 11/2013 |
| JP | 2014-068262 A | 4/2014 |
| JP | 2014-191653 A | 10/2014 |
| KR | 10-2012-0093413 A | 8/2012 |
| RU | 2012 157 777 A | 7/2014 |
| WO | WO 2013/127233 A1 | 9/2013 |
| WO | WO 2015/055098 A1 | 4/2015 |

OTHER PUBLICATIONS

Office Action dated Dec. 4, 2017 for Chinese Application No. 201510850304.1, 6 pages.
International Preliminary Report on Patentability dated May 29, 2018 for International Application No. PCT/CN2015/099605, 9 pages.
Extended European Search Report dated Apr. 3, 2017 for European Application No. 16187461.5, 7 pages.
International Search Report dated Aug. 25, 2016 for International Application No. PCT/CN2015/099605, 12 pages.
Office Action dated Aug. 30, 2017 for Korean Application No. 10-2016-7009521, 5 pages.
Office Action dated Sep. 18, 2017 for Russian Application No. 2016119720/08, 6 pages.
Office Action dated Mar. 13, 2018 for Japanese Application No. 2016-519916, 4 pages.

* cited by examiner

DISPLAY SCREEN UNLOCKING METHOD AND APPARATUS

CROSS-REFERENCE TO RELATED APPLICATIONS

This application claims priority to the Chinese Patent Application No. 201510850304.1, filed on Nov. 28, 2015, which is incorporated herein by reference in its entirety.

TECHNICAL FIELD

The present disclosure is related to the field of user interfaces, and more particularly, to methods and apparatus for unlocking display screens of electronic devices.

BACKGROUND

As a security measure, biological information such as fingerprint rather than passcodes may be conveniently used for unlocking electronic devices such as cell phones. Usually, after unlocking based on fingerprint recognition, an electronic device such as a cell phone enters a display interface of a home screen. Unlocking does not invoke other additional functions.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for unlocking a display screen of an electronic device is disclosed. The method includes unlocking the display screen in response to an unlocking operation of a user in an application for unlocking the display screen; and automatically switching to an internal interface of a second application of the electronic device according to pre-determined configuration information for the application for unlocking the display screen, wherein the internal interface is an interface of the second application other than a home interface of the second application, and the configuration information of the application for unlocking the display screen is used to identify the internal interface of the second application to be switched to.

In another embodiment, an electronic device is disclosed. The electronic device includes a processor; a display screen; and a memory storing an instruction executable by the processor, wherein the processor is configured to cause the electronic device to unlock the display screen in response to an unlocking operation of a user in an application for unlocking the display screen; and automatically switch to an internal interface of a second application of the electronic device according to pre-determined configuration information for the application for unlocking the display screen, wherein the internal interface is an interface of the second application other than a home interface of the second application, and the configuration information of the application for unlocking the display screen is used to identify the internal interface of the second application to be switched to.

In yet another embodiment, a non-transitory computer-readable storage medium having stored therein instructions is disclosed. The instructions, when executed by a processor of a mobile terminal, causes the mobile terminal to unlock a display screen of the mobile terminal in response to an unlocking operation of a user in an application for unlocking the display screen; and automatically switch to an internal interface of a second application of the mobile terminal according to pre-determined configuration information for the application for unlocking the display screen, wherein the internal interface is an interface of the second application other than a home interface of the second application, and the configuration information of the application for unlocking the display screen is used to identify the internal interface of the second application to be switched to.

It should be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1A:
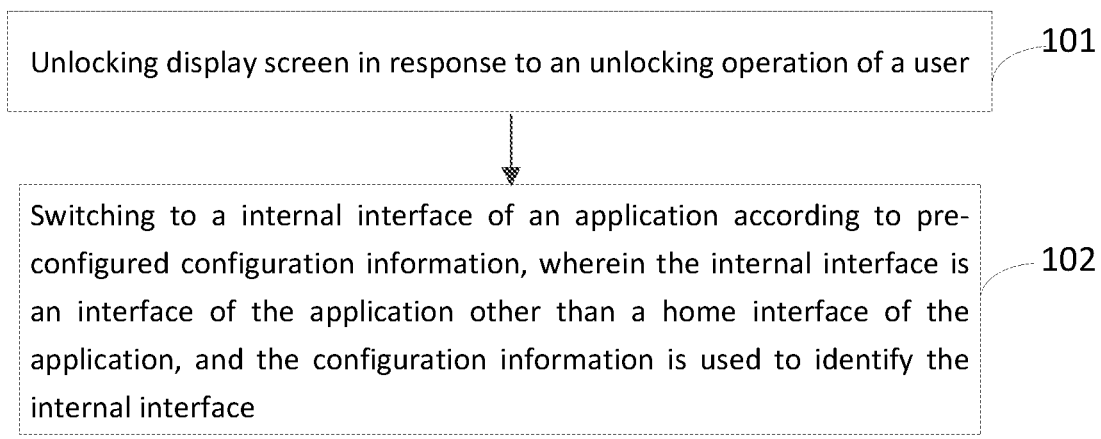
FIG. 1A is a flow chart showing a method for unlocking a display screen of a terminal device according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise presented. The embodiments set forth in the following description of exemplary embodiments do not represent all embodiments consistent with the invention. Instead, they are merely examples of apparatuses and methods consistent with aspects related to the invention as recited in the appended claims.

Terms used in the disclosure are only for purpose of describing particular embodiments, and are not intended to be limiting. The terms "a", "said" and "the" used in singular form in the disclosure and appended claims are intended to include a plural form, unless the context explicitly indicates otherwise. It should be understood that the term "and/or" used in the description means and includes any or all combinations of one or more associated and listed terms.

It should be understood that, although the disclosure may use terms such as "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

In the embodiments of the present disclosure, the term "terminal" is used to refer to an exemplary electronic device such as a cell phone. It may be interchangeably referred to as mobile terminal, mobile phone, smart phone, smart terminal, terminal device, mobile device, and the like. The term "application" means an application installed in a terminal. It may be alternatively referred to as an "app". A terminal includes a user interface for facilitating human-machine interaction. The user interface may be based on software and hardware such as display panels, keyboards, touch panels, and voice input/output devices. The term "jumping" is used to refer to the action of switching between display interfaces and is interchangeably with "switching".

By way of introduction, when a user attempts to unlock a locked display screen of a terminal device, she may desire to invoke some particular application directly without having to start from the home screen of the terminal device and navigate to the particular application. The user may further desire to view a particular interface within an application (herein referred to as an internal interface of the application) upon unlocking without having to performing any navigation. For example, the user may desire to view some particular secondary interface of a news application every time she unlocks the display screen of her smart phone. This disclosure describes methods and apparatus for unlocking display screen of an electronic device and automatically switching to an internal interface of an application that is pre-configured.

FIG. 1A is a flow chart showing a method for unlocking display screen of an electronic device such as a terminal device according to an exemplary embodiment. The terminal may include an unlocking application that monitors a user input for unlocking the display screen of the terminal device. The input for unlocking may be, for example, via a HOME key on the terminal device. In Step 101, the unlocking application unlocks the display screen in response to an unlocking operation of a user. The user may perform the unlocking operation through an input interface of the terminal device. For example, the user may trigger unlocking of the display screen by pressing the HOME key.

In Step 102, the unlocking application brings to the foreground of the display screen of the terminal device an internal interface of an application according to pre-configured configuration information, wherein the internal interface of the application is an interface other than the home interface of the application, and wherein the configuration information is used to specify which internal interface to show upon unlocking of the display screen of the terminal device. Specifically, there may be various manners for the configuration information to identify the internal interface of the application, which will not be limited in this embodiment. Each application is associated with its own configuration information. Configuration information for various applications may be managed by the operating system and may be accessed and/or set up by a user. Here, the unlocking application is just one of the many applications running on the terminal device. The configuration information of the unlocking application may be set up to specify which internal interface should be invoked upon unlocking of the display screen. Herein, the application associated with the internal interface to be called by the unlocking application upon unlocking of the display screen may be differentiated from the unlocking application by being referred to as the second application.

Figure 1B:
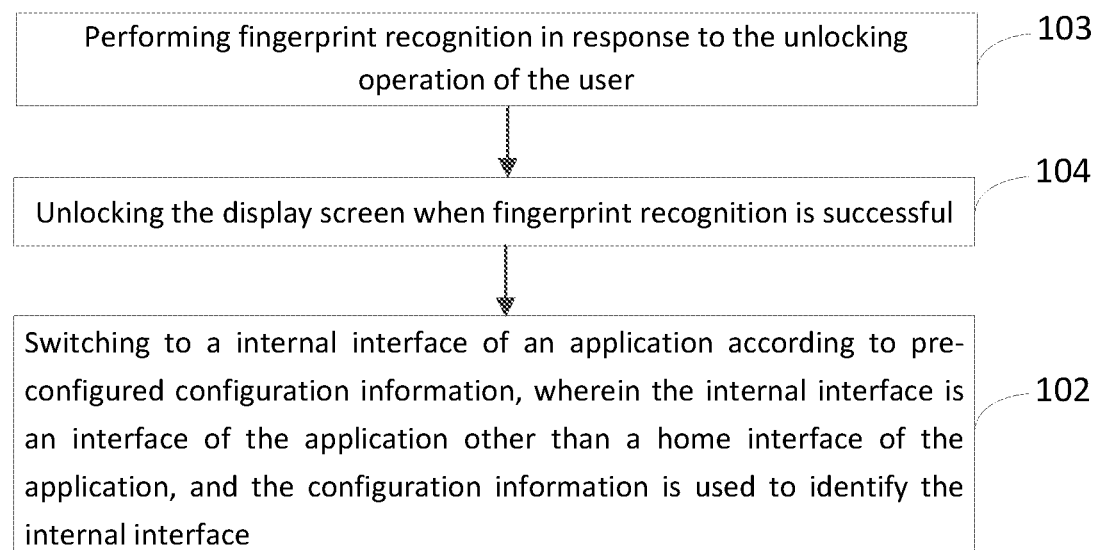
FIG. 1B is a flow chart showing another method for unlocking a display screen of a terminal device according to another exemplary embodiment.

Various unlocking input mechanisms may be employed. Display screen unlocking based on fingerprint input and figure print recognition is one of the examples. FIG. 1B is a flow chart showing an exemplary implementation of the step 101 of FIG. 1A. In FIG. 1B, step 101 may be implemented as steps 103 and 104. In Step 103, the terminal device performs fingerprint recognition via the unlocking application when the user performs the unlocking operation by, for example, pressing the HOME key. In Step 104, the terminal device performs screen unlocking when fingerprint recognition is successful.

Specifically, after unlocking by fingerprint recognition is triggered by an unlocking operation performed by the user, e.g., pressing a screen unlocking key or the HOME key, a fingerprint sensor associated with the unlocking key or the HOME key is activated for fingerprint data collection. Using fingerprint recognition technologies, fingerprint data collected by the fingerprint sensor while the display screen is still locked is processed by the terminal device and compared with a fingerprint data registered by the user in advance. If there is a match, it is determined that fingerprint verification is successful, and then screen unlocking is performed. The fingerprint data processing steps may be performed within the unlocking application or may be performed by a separate software component of the terminal device that is in communication with the unlocking application. For example, the unlocking application may make a function call for fingerprint data processing. In particular, the unlocking application may provide software components that support fingerprint data processing and recognition function. When unlocking the screen, the unlocking application may make function-calls (such as Application Program Interface calls, or API calls) to a fingerprint manager software, such as the Fingerprint Manager in Google, the Android M version, to perform fingerprint recognition.

Upon successful matching, the unlocking application may proceed to unlock the display screen. Specifically, the step 103 above may be implements as step 105 shown in FIG. 1C and step 105 may comprise performing fingerprint recognition by making a function call to a Fingerprint Manager in response to the unlocking operation of the user.

An internal interface of an application refers to an interface of an application other than the home interface of the application. An internal interface may be a secondary interface, a third-level interface of the application or the like. For example, FIG. 1D shows a schematic drawing of a locked display interface of the terminal device. FIGS. 1E and 1F show schematic drawings of examples of internal interfaces of applications. According to the embodiment of FIG. 1, the initial interface before unlocking of the screen is the locked interface shown in FIG. 1D. The user performs an unlocking operation by, for example, finger recognition. After unlocking, a corresponding internal interface of an application, such as the internal interface of a Microblog application shown in FIG. 1E, is presented to the user on the display screen. For example, the configured internal interface may be a secondary interface for publishing a new blog. As another example, the internal interface of Wechat shown in FIG. 1F, i.e., a secondary interface for making a payment using Wechat, may be configured to be presented to the user on the display screen after unlocking.

Thus, by applying the method for unlocking display screen provided by the embodiment of FIG. 1, after a user triggers unlocking of the display screen by an unlocking operation, a corresponding internal interface of an application is directly shown on the display screen to the user according to pre-configured configuration information (of the unlocking application), wherein the internal interface of the application is an interface of the application other than the home interface of the application. The user thus may reach a desired interface within an application directly after unlocking rather than having to carry out time-consuming multi-step navigation to reach the desired internal interface.

Figure 1C:
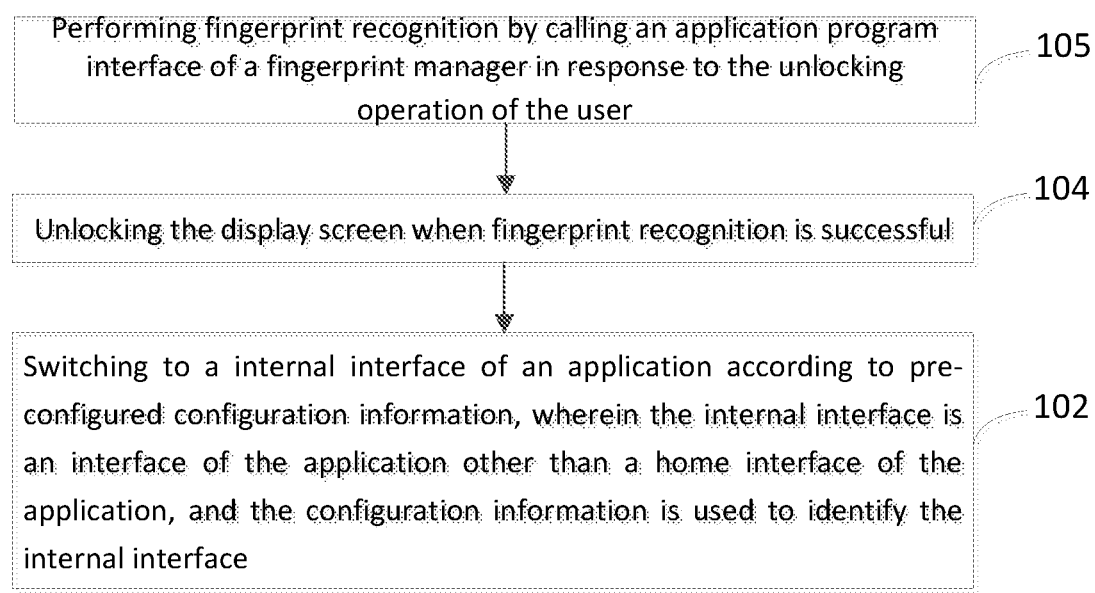
FIG. 1C is a flow chart showing another method for unlocking a display screen of a terminal device according to yet another exemplary embodiment.
Figure 1D:
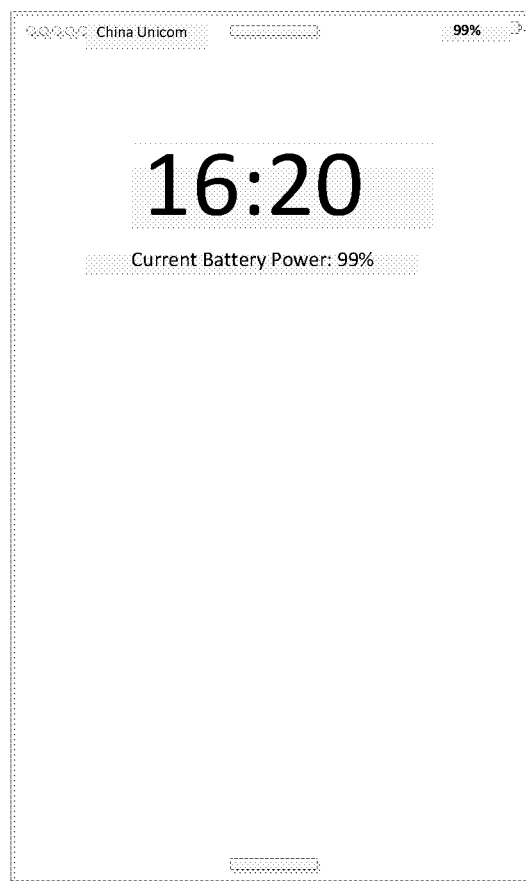
FIG. 1D illustrates a display interface of a locked screen according to an exemplary embodiment.
Figure 1E:
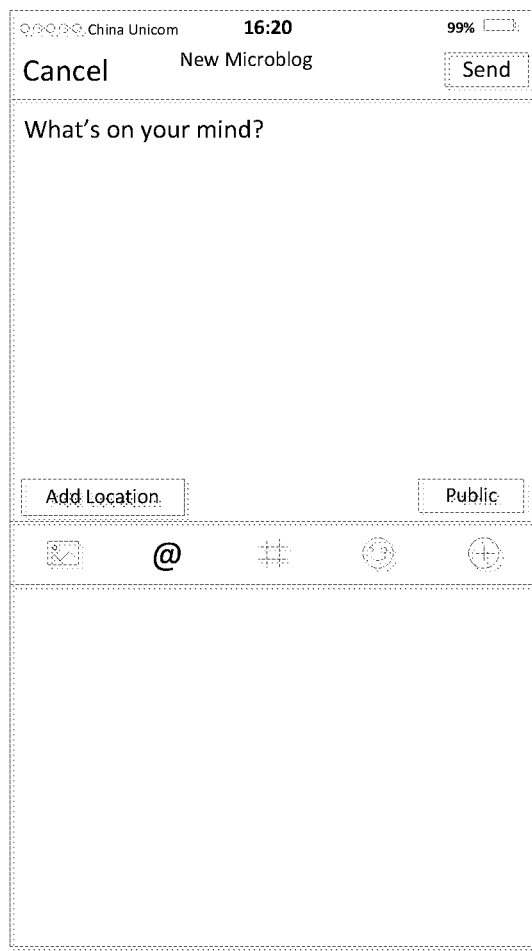
FIG. 1E illustrates an exemplary internal interface of an application.
Figure 1F:
FIG. 1F illustrates another exemplary internal interface of an application.
Figure 2:
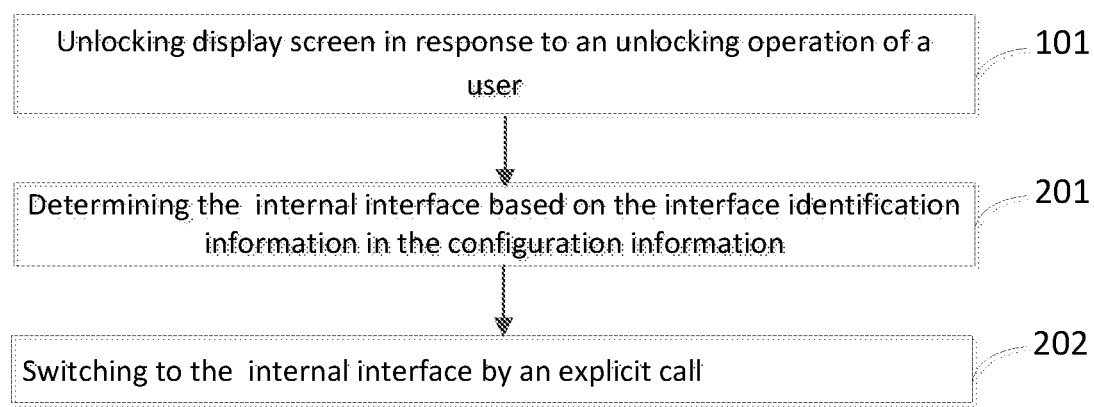
FIG. 2 is a flow chart showing a method for unlocking a display screen of a terminal device according to an exemplary embodiment.

In one implementation, a target internal interface to be displayed upon unlocking may be indicated by an identification information, as shown by a corresponding flow chart in FIG. 2 based on any of the embodiment shown in FIGS. 1A-1C. The configuration information may comprise the identification of the internal interface of the application desired by the user to be shown upon unlocking of the display screen. Accordingly and as shown in FIG. 2, Step 102 of FIG. 1 may comprise the following steps:

Step 201: the unlocking application determines the desired internal interface based on the identification information in the configuration information; and Step 202: the unlocking application invokes the identified internal interface by an explicit call.

The interface identification is used to identify the internal interface desired to be shown upon unlocking. In actual application, the interface identification may take many forms, such as an interface name, an interface path, an interface sequence number or the like, which will not be limited in this embodiment. The identifications of internal interfaces of an application that supports invoking of its internal interfaces by other applications or the operating system may be pre-specified by that application and registered with the operating system by being including the identifications in the configuration information of that application. Further, the internal interface may be invoked by the unlocking application via various mechanisms. In one implementation, for example, because identification information of various internal interfaces of various applications is specified in their configuration information and the user can access this information via the operating system when setting up the configuration information of the unlocking application. The user thus can specify in the configuration information of the unlocking information the identification of the desired internal interface for an explicit call of that internal interface upon unlocking of the display screen. In an explicit call, in other words, an internal interface to be called is explicitly specified in the configuration information of the unlocking application using the interface identification of the internal interface.

An example is given by illustrating an actual application scene. The unlocking application first performs screen unlocking according to the unlocking operation of the user. The unlocking application then identifies the internal interface to be opened upon unlocking the screen by looking up its configuration information. Upon obtaining the identification of the internal interface, explicit call is made to the application that the identified internal interface is associated with. Upon receiving the explicit call, the application invokes the identified internal interface of the application. The current interface of the display screen is thus switched to the explicitly called internal interface of the associated application based on the pre-configured configuration information of the unlocking application which explicitly specifies the identification of the target internal interface. For an application supporting multiple internal interfaces, each internal interface may be associated with one identifier. Calls to any desired internal interface may be made explicitly by using the identification of the internal interfaces.

Thus, by applying the unlocking method provided by the embodiment of FIG. 2, the configuration information includes an interface identification of the internal interface desired to be shown after the screen is unlocked. The corresponding internal interface is reached through an explicit call by the unlocking application according to the interface identification contained in the configuration information, so that the user is automatically directed to an interface she desires without multi-step navigation after unlocking of the screens.

Figure 3A:
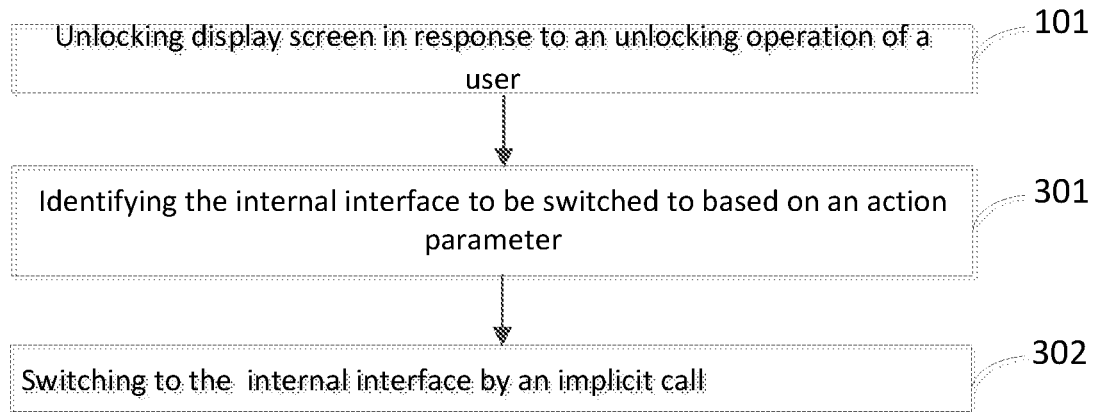
FIG. 3A is a flow chart showing another method for unlocking a display screen of a terminal device according to another exemplary embodiment.

In another implementation, the target internal interface to be shown upon unlocking of the display screen may be indicated by a specific action parameter specified in the configuration information of the unlocking application. Accordingly, FIG. 3A shows a flow chart based on any of the embodiment shown in FIGS. 1A-1C. In FIG. 3A the configuration information may comprise a preset action parameter. Accordingly and as shown by FIG. 3A, the step 102 of FIG. 1 may comprise the following steps:

Step 301: the unlocking application determines the internal interface to be shown based on the action parameter included in the declaration of the internal interface; and Step 302: switching to the internal interface by an implicit call.

Specifically, the switching to the pre-configured internal interface may be implemented via an implicit call. The unlocking application may call an internal interface having a declaration of action parameter matching the action parameter contained in the configuration information of the unlocking application. An action parameter may correspond to a certain capability of internal interfaces of applications.

Figure 3B:
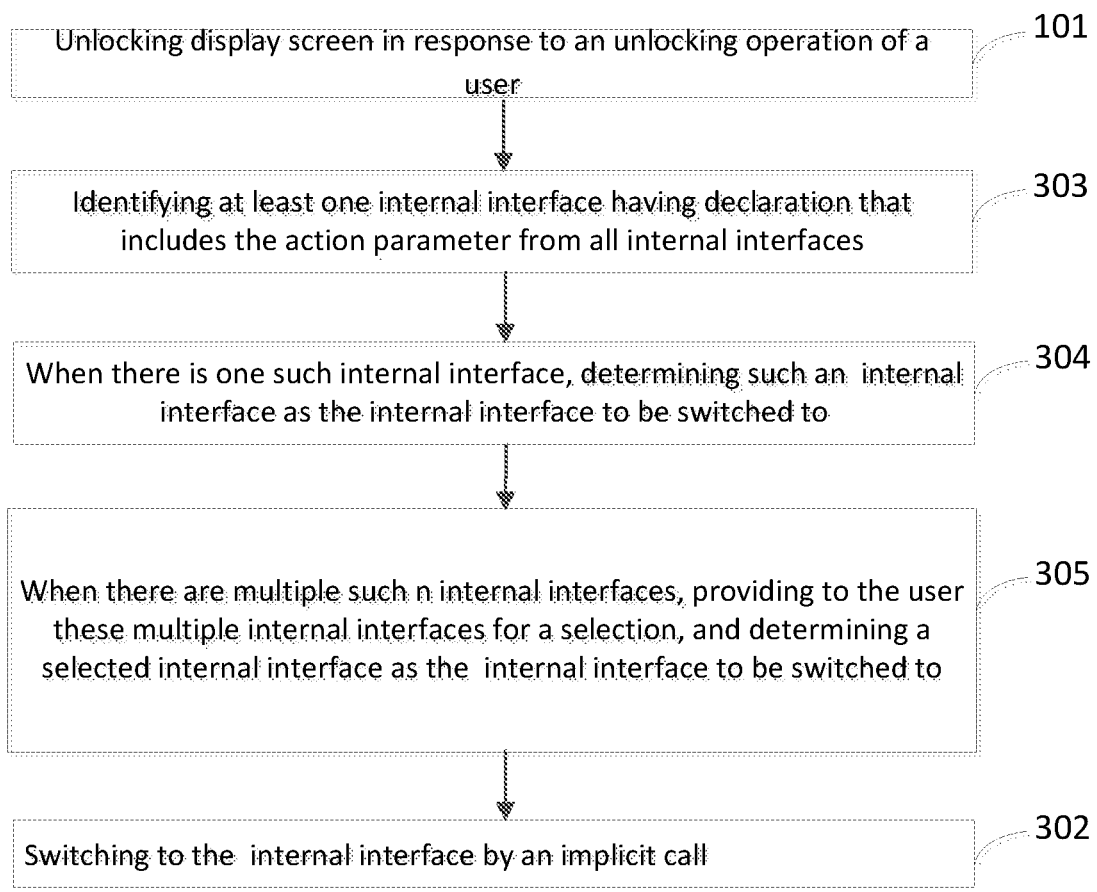
FIG. 3B is a flow chart showing another method for unlocking a display screen of a terminal device according to yet another exemplary embodiment.

In actual implementation, there may be one or more internal interfaces (of one or more applications) having declaration of the action parameter. When there is one such internal interface, the unlocking application may directly switch to that internal interface via an implicit call. When there are multiple such internal interfaces, the unlocking application may switch to one of these internal interfaces based on a user selection. Accordingly, FIG. 3B shows a flow chart based on the embodiment shown in FIG. 3A, where the step 301 of FIG. 3A may comprise the following steps in FIG. 3B:

Step 303: the unlocking application selects/identifies all internal interfaces having declaration of the action parameter specified in the configuration information from all the internal interfaces of various applications;

Step 304: if there is one such internal interface, the unlocking application determines that internal interface as the internal interface to be shown upon unlocking of the display screen;

Step 305: if there are multiple such internal interfaces, the unlocking application shows the user all these internal interfaces, prompt the user for selection, and determine one internal interface selected by the user from these multiple internal interfaces as the internal interface to be shown upon unlocking of the display screen.

For example, a user may desire to open an email interface upon unlocking of the screen. An action parameter "mailto" rather than an explicit identification of a specific internal email interface of a specific application may be specified in the configuration information of the unlocking application. There may one application or multiple applications that provide internal interface for sending emails. They may support calls to invoke their email interface from other applications via action parameters. Upon unlocking of the screen, the unlocking application checks the setup in its own configuration information and makes an implicit call according to the "mailto" action parameter to an application having an internal interface capable of sending emails. These applications are the ones that have declared the "mailto" action parameters. If there is only one such application, the internal email interface of that application is called and displayed. If there are multiple such applications, the user may be prompted to choose one application from a list of these applications. The selected application by the user may then be called to invoke its internal interface for sending email.

The action parameter may be set according to the needs. For example, it can be a system action constant "miui.fingerprint.quicklaunch". In this embodiment, by using an implicit call, when a new internal interface to be switched to upon screen unlocking is desired by the user, the configuration information of that application internal interface only need to declare the "miui.fingerprint.quicklaunch" action parameter. Once set up, when the screen is unlocked, that internal interface can be suggested to the user as a candidate internal interface to be switched to. The unlocking application may then switch the display interface to user-selected internal interface.

To summarize, by applying the unlocking method provided by this embodiment, the configuration information includes an action parameter. After the screen is unlocked, the internal interface to be switched to can be determined according to the configuration information and the declarations of internal interfaces. By using an implicit call, the unlocking application may switch the display screen to the desired internal interface without having the user perform multiple navigation steps. When a new desired internal interface upon unlocking needs to be added, it only needs to declare the action parameter in the configuration information of the application internal interface, improving setup convenience.

Figure 4A:
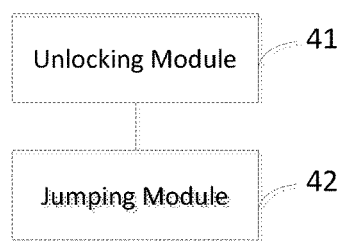
FIG. 4A is a block diagram of an apparatus for unlocking a display screen according to an exemplary embodiment.

FIG. 4A is a block diagram of an unlocking apparatus according to an exemplary embodiment. As shown in FIG. 4A, the unlocking apparatus may comprise an unlocking module 41 configured to perform screen unlocking according to an unlocking operation of a user; and a jumping module 42 configured to jump to an internal interface of an application according to pre-configured configuration information, wherein the internal interface is an interface of the application other than the home interface the application, and the configuration information is used to the internal interface. The unlocking apparatus may be included in a smart terminal. A user may perform operations through a user input interface of the smart terminal to trigger, for example, an execution of fingerprint recognition.

Figure 4B:
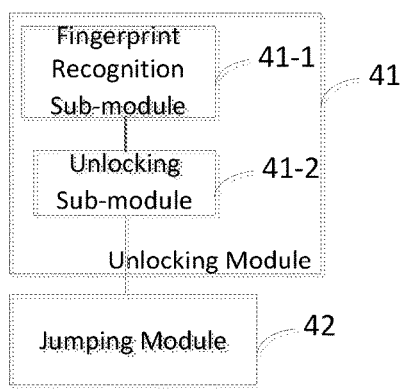
FIG. 4B is another block diagram of an apparatus for unlocking a display screen according to another exemplary embodiment.
Figure 4C:
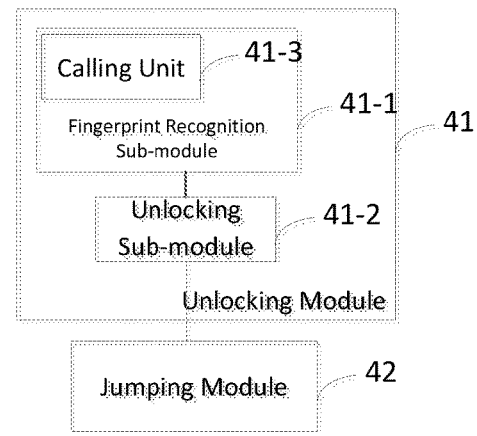
FIG. 4C is a block diagram of another apparatus for unlocking a display screen according to yet another exemplary embodiment.

FIG. 4B shows one implementation of the unlocking module 41 using a specific unlocking mechanism. In particular, the unlocking module 41 in FIG. 4B may comprise a fingerprint recognition sub-module 41-1 configured to perform fingerprint recognition according to the unlocking operation of the user; and an unlocking sub-module 41-2 configured to perform screen unlocking when fingerprint recognition is successful. For this implementation, the unlocking apparatus thus needs support of a fingerprint recognition function. FIG. 4C shows a specific implementation of the fingerprint recognition sub-module 41-1 of FIG. 4B. Particularly, the fingerprint recognition sub-module 41-1 may comprise a calling unit 41-3 configured to perform fingerprint recognition by calling a function call interface of a Fingerprint Manager according to the unlocking operation of the user.

Figure 5:
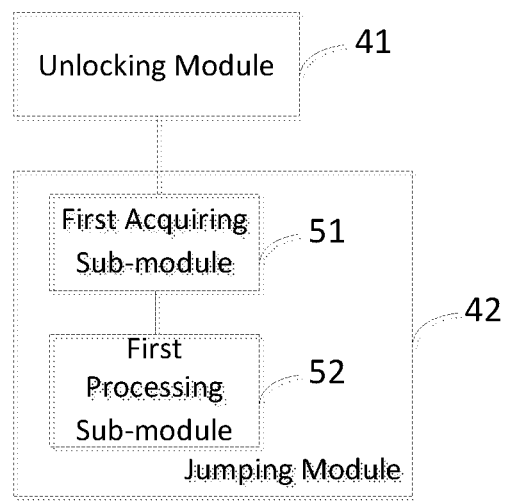
FIG. 5 is a block diagram of another apparatus for unlocking a display screen according to yet another exemplary embodiment.

In one implementation, a target interface to be jumped to can be indicated by an interface identification. Accordingly, FIG. 5 shows a block diagram of an unlocking apparatus based on any of the embodiment shown in FIGS. 4A-4C. In the apparatus of FIG. 5, the configuration information may comprise an interface identification of the internal interface to be switched to. Accordingly, the jumping module 42 in FIG. 5 may comprise a first acquiring sub-module 51 configured to determine the internal interface to be switched to based on the interface identification; and a first processing sub-module 52 configured to jump to the internal interface identified by the first acquiring sub-module 51 via an explicit call.

Figure 6A:
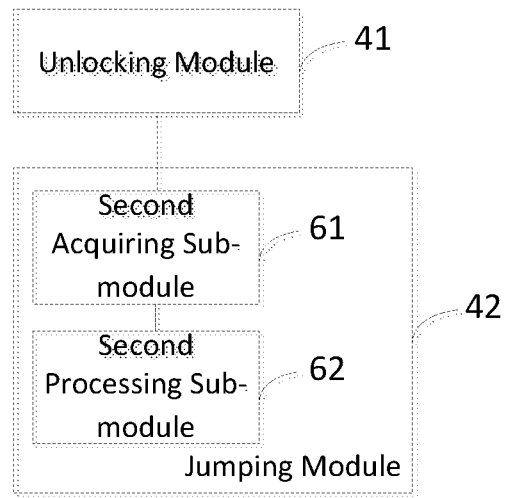
FIG. 6A is a block diagram of another apparatus for unlocking a display screen according to yet another exemplary embodiment.

In another implementation, a target internal interface to be jumped to can be indicated by a specific action parameter. FIG. 6A shows a block diagram of an unlocking apparatus based on any of the embodiment shown in FIGS. 4A-4C. In FIG. 6A, the configuration information may comprise a preset action parameter. Accordingly, the jumping module 42 in FIG. 6A may comprise a second acquiring sub-module 61 configured to determine the internal interface to be switched to based on the action parameter in the configuration file and declaration information of internal interfaces of applications; a second processing sub-module 62 configured to jump to the internal interface determined by the second acquiring sub-module 61 via an implicit call.

Figure 6B:
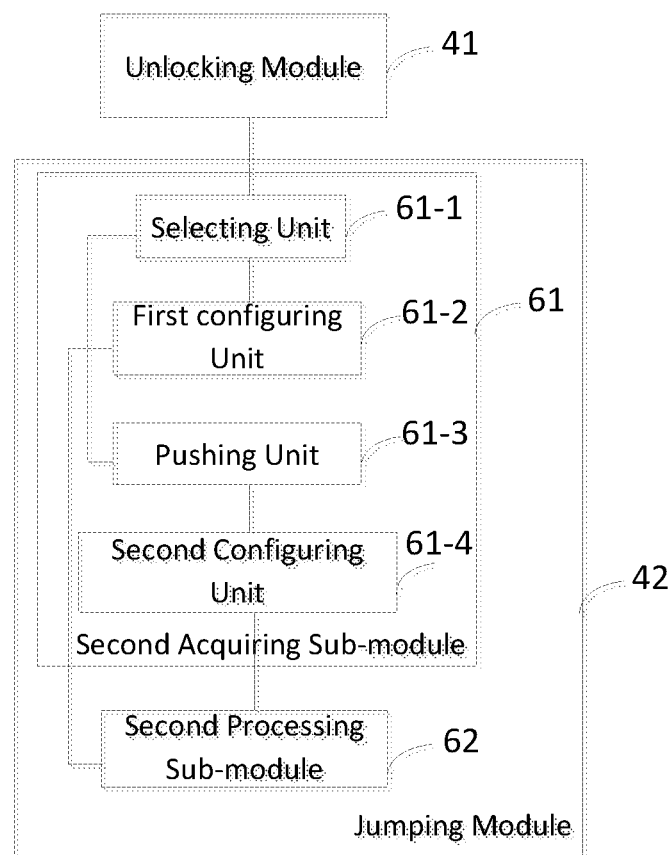
FIG. 6B is a block diagram of yet another apparatus for unlocking a display screen according to yet another exemplary embodiment.

In actual application, there may be one or more internal interfaces having declaration of the action parameter. When there is one such internal interface, that internal interface can be directly jumped to through an implicit call by the second processing sub-module 62. When there are multiple such internal interfaces, the internal interface to be redirected to can be further determined based on the user's selection. Accordingly, FIG. 6B shows a block diagram of an unlocking apparatus based on the embodiment shown in FIG. 6A. The second acquiring sub-module 61 may comprise a selecting unit 61-1 configured to select all the internal interfaces having declaration of the action parameter from all the application internal interfaces; a first configuring unit 61-2 configured to, if there is one such internal interface, determine such internal interface as internal interface to be switched to; a pushing unit 61-3 configured to, if there are multiple such internal interfaces, push to the user all the internal interfaces having declaration of the action parameter; and a second configuring unit 61-4 configured to identify an internal interface selected by the user from these multiple internal interfaces as the internal interface to be switched to.

The detailed description in the method embodiments of FIGS. 1, 2 and 3 corresponding to the various modules, sub-modules and units above applies to FIGS. 4, 5, and 6 and is not repeated here.

Figure 7:
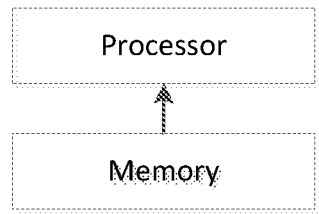
FIG. 7 is a block diagram of a device for unlocking a display screen according to an exemplary embodiment.

FIG. 7 is a block diagram of an unlocking apparatus according to an exemplary embodiment. As shown in FIG. 7, the apparatus can be realized by comprising a processor, and a memory storing an instruction executable by the processor, wherein the processor is configured to: perform at least one of the methods described in FIGS. 1, 2, and 3.

Figure 8:
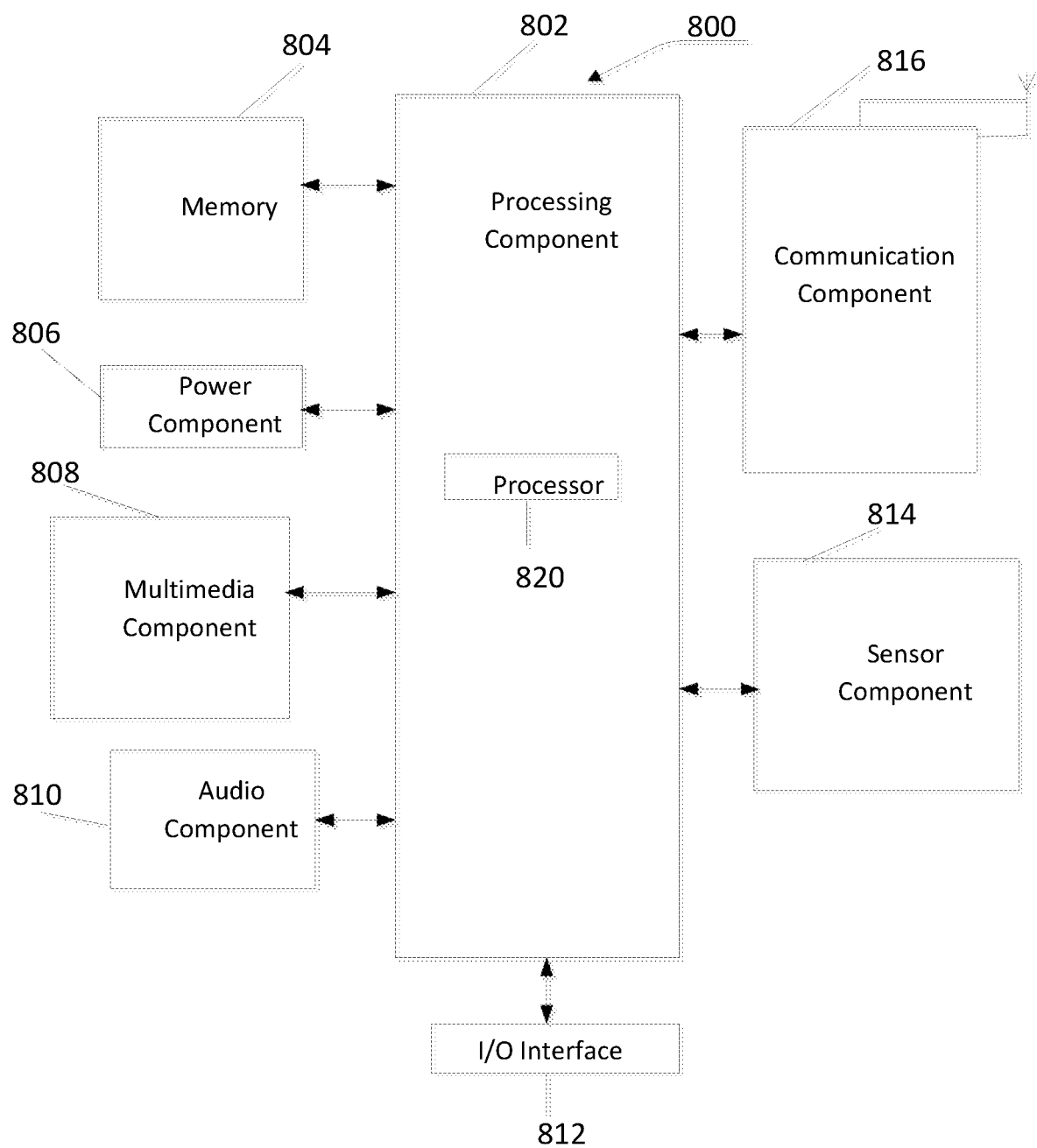
FIG. 8 is a block view of another device for unlocking a display screen according to another exemplary embodiment.

FIG. 8 is a block view of an unlocking apparatus 800 according to another exemplary embodiment. For example, the apparatus 800 may be a mobile phone, a computer, a tablet, a medical device, a fitness equipment, a personal digital assistant or the like.

Referring to FIG. 8, the apparatus 800 may further comprise one or more of the following components: a processing component 802, a memory 804, a power component 806, a multimedia component 808, an audio component 810, an input/output (I/O) interface 812, a sensor component 814, and a communication component 816.

The processing component 802 controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power supply management system, one or more power sources, and any other components associated with the generation, management, and distribution of power in the apparatus 800.

The multimedia component 808 includes a display screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor or thermometer.

The communication component 816 is configured to facilitate communication, wired or wirelessly, between the apparatus 800 and other devices. The apparatus 800 can access a wireless network based on a communication standard, such as WiFi, 2G, 3G, LTE, or 4G cellular technologies, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

The exemplary embodiments also provides a non-volatile computer-readable storage medium containing instructions, such as the memory 804 containing instructions which may be executed by the processing component 820 of the unlocking apparatus 800 to perform the above methods. For example, the non-volatile computer-readable storage medium may be a ROM, a RAM, a CD-ROM, a tape, a floppy disc, an optical data storage device or the like.

There is provided a non-volatile computer-readable storage medium storing instructions therein, which when executed by the processor of the unlocking apparatus, causes the unlocking apparatus to perform at least one of the unlocking methods described in FIGS. 1, 2, and 3.

Each module or unit discussed above for FIG. 4-9, such as the unlocking module, the jumping module, the fingerprint recognition sub-module, the jumping module, the calling unit, the first acquiring sub-module, the first processing sub-module, the second acquiring sub-module, the second processing sub-module, the selecting unit, the first configuring unit, the pushing unit, and the second configuring unit may take the form of a packaged functional hardware unit designed for use with other components, a portion of a program code (e.g., software or firmware) executable by the processor 820 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A method for unlocking a display screen of an electronic device, comprising:
   unlocking the display screen in response to an unlocking operation of a user in an application for unlocking the display screen; and
   automatically switching to an internal interface of a second application of the electronic device according to pre-determined configuration information for the application for unlocking the display screen, wherein the pre-determined configuration information comprises a preset action parameter,
   wherein the internal interface is an interface of the second application other than a home interface of the second application, and the pre-determined configuration information of the application for unlocking the display screen is used to identify the internal interface of the second application to be switched to,
   and wherein automatically switching to the internal interface of the second application according to the pre-determined configuration information comprises:
      determining the internal interface of the second application based on the preset action parameter by:
         identifying at least one internal interface having a declaration including the preset action parameter from all internal interfaces of at least one application, wherein the declaration is configured by the at least one application in the at least one internal interface to match the preset action parameter in the pre-determined configuration information;
         when one such internal interface is identified, determining the identified internal interface as the internal interface to be switched to; and
         when multiple such internal interfaces are identified, providing to the user a list of the identified multiple internal interfaces for a user selection, and determining an internal interface selected by the user from the list as the internal interface to be switched to.

2. The method according to claim 1,
   wherein the pre-determined configuration information of the application for unlocking the display screen comprises an interface identification of the internal interface of the second application; and
   wherein automatically switching to the internal interface of the second application according to the pre-determined configuration information of the application for unlocking the display screen comprises:
      determining the internal interface of the second application based on the interface identification; and
      automatically switching to the internal interface of the second application by an explicit call to the second application to display the internal interface.

3. The method according to claim 2, wherein unlocking the display screen in response to the unlocking operation of the user comprises:
   performing fingerprint recognition in response to the unlocking operation of the user; and
   unlocking the display screen when the fingerprint recognition is successful.

4. The method according to claim 3, wherein performing the fingerprint recognition in response to the unlocking operation of the user comprises performing the fingerprint recognition by calling an application program interface of a fingerprint manager in response to the unlocking operation of the user.

5. The method according to claim 1,
   wherein automatically switching to the internal interface of the second application according to the pre-determined configuration information comprises:
      determining the internal interface of the second application based on the preset action parameter; and
      automatically switching to the internal interface of the second application by an implicit call according to the preset action parameter.

6. The method according to claim 5, wherein unlocking the display screen in response to the unlocking operation of the user comprises:

performing fingerprint recognition in response to the unlocking operation of the user; and unlocking the display screen when the fingerprint recognition is successful.

7. The method according to claim 6, wherein performing the fingerprint recognition in response to the unlocking operation of the user comprises performing the fingerprint recognition by calling an application program interface of a fingerprint manager in response to the unlocking operation of the user.

8. The method according to claim 1, wherein unlocking the display screen in response to the unlocking operation of the user comprises:

performing fingerprint recognition in response to the unlocking operation of the user; and unlocking the display screen when the fingerprint recognition is successful.

9. The method according to claim 8, wherein performing the fingerprint recognition in response to the unlocking operation of the user comprises performing the fingerprint recognition by calling an application program interface of a fingerprint manager in response to the unlocking operation of the user.

10. An electronic device, comprising:
a processor;
a display screen; and
a memory storing an instruction executable by the processor, wherein the processor is configured to cause the electronic device to:
unlock the display screen in response to an unlocking operation of a user in an application for unlocking the display screen; and
automatically switch to an internal interface of a second application of the electronic device according to pre-determined configuration information for the application for unlocking the display screen, wherein the pre-determined configuration information comprises a preset action parameter,
wherein the internal interface is an interface of the second application other than a home interface of the second application, and the pre-determined configuration information of the application for unlocking the display screen is used to identify the internal interface of the second application to be switched to,
and wherein to automatically switch to the internal interface of the second application according to the pre-determined configuration information, the processor is configured to cause the electronic device to:
determine the internal interface of the second application based on the preset action parameter by:
identifying at least one internal interface having a declaration including the preset action parameter from all internal interfaces of at least one application, wherein the declaration is configured by the at least one application in the at least one internal interface to match the preset action parameter in the pre-determined configuration information;
when one such internal interface is identified, determining the identified internal interface as the internal interface to be switched to; and
when multiple such internal interfaces are identified, providing to the user a list of the identified multiple internal interfaces for a user selection, and determining an internal interface selected by the user from the list as the internal interface to be switched to.

11. The electronic device according to claim 10,
wherein the pre-determined configuration information of the application for unlocking the display screen comprises an interface identification of the internal interface of the second application; and
wherein, to automatically switch to the internal interface of the second application according to the pre-determined configuration information of the application for unlocking the display screen, the processor is configured to cause the electronic device to:
determine the internal interface of the second application based on the interface identification; and
automatically switch to the internal interface of the second application by an explicit call to the second application to display the internal interface.

12. The electronic device according to claim 11, wherein to unlock the display screen in response to the unlocking operation of the user, the processor is configured to cause the electronic device to:
perform fingerprint recognition in response to the unlocking operation of the user; and
unlock the display screen when the fingerprint recognition is successful.

13. The electronic device according to claim 10,
wherein, to automatically switch to the internal interface of the second application according to the pre-determined configuration information, the processor is configured to cause the electronic device to:
determine the internal interface of the second application based on the preset action parameter; and
automatically switch to the internal interface of the second application by an implicit call according to the preset action parameter.

14. The electronic device according to claim 10, wherein to unlock the display screen in response to the unlocking operation of the user, the processor is configured to cause the electronic device to:
perform fingerprint recognition in response to the unlocking operation of the user; and
unlock the display screen when the fingerprint recognition is successful.

15. The electronic device according to claim 14, wherein to perform the fingerprint recognition in response to the unlocking operation of the user, the processor is configured to cause the electronic device to perform the fingerprint recognition by calling an application program interface of a fingerprint manager in response to the unlocking operation of the user.

16. A non-transitory computer-readable storage medium having stored therein instructions that, when executed by a processor of a mobile terminal, causes the mobile terminal to:
unlock a display screen of the mobile terminal in response to an unlocking operation of a user in an application for unlocking the display screen; and
automatically switch to an internal interface of a second application of the mobile terminal according to pre-determined configuration information for the application for unlocking the display screen, wherein the pre-determined configuration information comprises a preset action parameter,
wherein the internal interface is an interface of the second application other than a home interface of the second application, and the pre-determined configuration information of the application for unlocking the display screen is used to identify the internal interface of the second application to be switched to, and wherein to automatically switch to the internal interface of the second application according to the pre-determined configuration information, the mobile terminal is further caused to:

determine the internal interface of the second application based on the preset action parameter by:
identifying at least one internal interface having a declaration including the preset action parameter from all internal interfaces of at least one application, wherein the declaration is configured by the at least one application in the at least one internal interface to match the preset action parameter in the pre-determined configuration information;
when one such internal interface is identified, determining the identified internal interface as the internal interface to be switched to; and
when multiple such internal interfaces are identified, providing to the user a list of the identified multiple internal interfaces for a user selection, and determining an internal interface selected by the user from the list as the internal interface to be switched to.

* * * * *